(12) United States Patent
Tzeng et al.

(10) Patent No.: US 7,594,810 B2
(45) Date of Patent: Sep. 29, 2009

(54) HIGH-VOLTAGE DISCHARGING REACTOR PROCESSING EXHAUSTED HYDROGEN GAS

(75) Inventors: Chih-Ching Tzeng, Yonghe (TW); Den-Lian Lin, Longtan Township, Taoyuan County (TW); Shiaw-Huei Chen, Yonghe (TW); Ming-Song Yang, Taipei (TW); Jyh-Ming Yan, Lujhu Township, Taoyuan County (TW); Yuh-Jenq Yu, Longtan Township, Taoyuan County (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 515 days.

(21) Appl. No.: 11/260,427

(22) Filed: Oct. 28, 2005

(65) Prior Publication Data
US 2007/0111147 A1 May 17, 2007

(51) Int. Cl.
*F23L 7/00* (2006.01)
*F23D 14/00* (2006.01)

(52) U.S. Cl. ............................ 431/5; 431/115; 422/168; 60/246; 60/247

(58) Field of Classification Search ............... 431/5; 422/168; 60/246, 247
See application file for complete search history.

(56) References Cited

U.S. PATENT DOCUMENTS

| | | | | |
|---|---|---|---|---|
| 4,421,474 A | * | 12/1983 | Meyer | 431/115 |
| 5,123,836 A | * | 6/1992 | Yoneda et al. | 431/5 |
| 5,310,334 A | * | 5/1994 | Spiros | 431/5 |
| 7,250,449 B2 | * | 7/2007 | Bullin et al. | 518/700 |
| 2005/0065223 A1 | * | 3/2005 | Bullin et al. | 518/703 |

* cited by examiner

*Primary Examiner*—Steven B McAllister
*Assistant Examiner*—Nikhil Mashruwala
(74) *Attorney, Agent, or Firm*—Troxell Law Office, PLLC

(57) ABSTRACT

The present invention provides a reactor utilizing high-voltage discharge for processing exhausted hydrogen gas emitted during membrane plating, etching, or washing of semiconductors, where higher than 95% of destruction and removal efficiency (DRE) of hydrogen gas is obtained.

7 Claims, 3 Drawing Sheets

| Test | Hydrogen (sL/min) | Nitrogen (sL/min) | Air (sL/min) | Total flow (sL/min) | H₂ original (ppm) | H₂ final (ppm) | Destruction and Removal Efficiency (%) | Sampling mouth temperature (°C) |
|---|---|---|---|---|---|---|---|---|
| 1 | 103 | 200 | 500 | 803 | 128,268 | 0 | >99.99# | 24.8 |
| 2 | 103 | 200 | 450 | 753 | 133,333 | 0 | >99.99# | 25.1 |
| 3 | 103 | 200 | 400 | 703 | 146,514 | 0 | >99.99# | 24.6 |
| 4 | 103 | 200 | 350 | 653 | 157,733 | 0 | >99.99# | 24.1 |
| 5 | 103 | 200 | 325 | 628 | 164,012 | 0 | >99.99# | 23 |
| 6 | 103 | 200 | 310 | 613 | 168,026 | 700 | 99.58 | 22.5 |
| 7 | 103 | 200 | 300 | 603 | 170,812 | 3,500 | 97.95 | 23.5 |

FIG. 3

HIGH-VOLTAGE DISCHARGING REACTOR PROCESSING EXHAUSTED HYDROGEN GAS

FIELD OF THE INVENTION

The present invention relates to a reactor; more particularly, relates to using a hydrogen igniting device, which comprises two spark igniting plugs powered by an alternating high-voltage power supplier and is connected with a cooling device and a metal cone for preventing backflow of gas, to process exhausted hydrogen gas during membrane-plating, etching, or cleaning of semiconductor chip manufacturing processing.

DESCRIPTION OF THE RELATED ART

In the atmosphere, normally hydrogen gas occupies only around 500 ppb. The hydrogen gas can be easily burned or even exploded, where its lowest burning temperature is 530° C. (mixed with air) or 450° C. (mixed with oxygen) and it is explosive when being burned with some specific material—such as a halogen (bromine, chlorine, and fluorine), lithium, densely cited platinium or specific metal, nitrogen trifluoride or oxygen difluoride.

The gas exhausted during a semiconductor manufacturing procedure may comprise a portion of hydrogen gas up to 33.3%, while some advanced nano-manufacture procedure may exhaust even more hydrogen. Although most of the gases exhausted during semiconductor manufacturing procedures are diluted with an amount of nitrogen for safety, the mixed gas is not suitable to be recycled because of the impurities and particles (e.g. silicon particles, phosphorous particles) it contains. Usually an electro-heated device with high temperature (e.g. electro-heated tungsten filament, high-temperature ceramics, flame nozzle) is used to burn out the hydrogen gas with air mixed; yet the removal efficiency is not good. Most factories directly exhaust hydrogen gas into the atmosphere where the hydrogen gas is diluted to conform within the safe range of volume explosive-limit after a simple filtering process for removing impurities and particles. The gas exhausted is not burned while it may comprise some potential hazards about industrial safety (e.g. hydrogen explosion) having possibilities of causing billions of loss to the factory. Hence, the prior art does not fulfill users' requests on actual use.

SUMMARY OF THE INVENTION

The main purpose of the present invention is to provide a high-voltage discharging reactor processing exhausted hydrogen to obtain safety and a destruction and removal efficiency (DRE) of hydrogen higher than 95%.

To achieve the above purpose, the present invention is a high-voltage discharging reactor for processing exhausted hydrogen gas, where a hydrogen igniting device in the reactor comprises two spark plugs powered by an alternating high-voltage power supply and is connected with a cooling device and a metal cone for preventing backflow of air; and, by providing oxygen-rich condition to obtain and ensure complete combustion for hydrogen burning with oxygen, a destruction and removal efficiency (DRE) of hydrogen higher than 95% is achieved. Accordingly, a novel high-voltage discharging reactor processing exhausted hydrogen is obtained.

BRIEF DESCRIPTION OF THE DRAWINGS

The present invention will be better understood from the following detailed description of the preferred embodiment according to the present invention, taken in conjunction with the accompanying drawings, in which

FIG. 3 is a table showing the relation between the destruction and removal efficiency (DRE) of hydrogen and the airflow rate according to the present invention.

DESCRIPTION OF THE PREFERRED EMBODIMENT

The following description of the preferred embodiment is provided to understand the features and the structures of the present invention.

Figure 1:
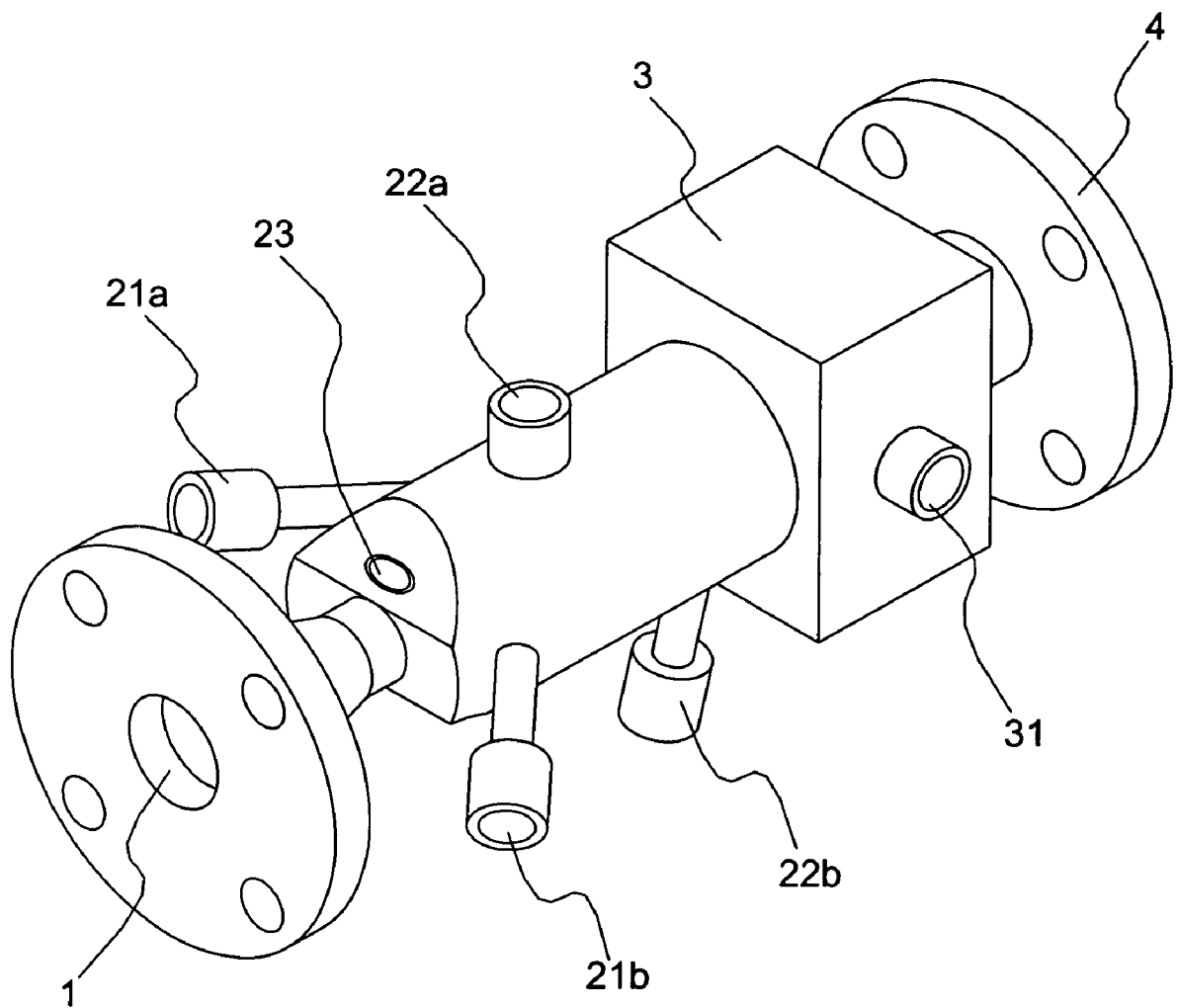
FIG. 1 is a perspective view of a preferred embodiment according to the present invention.
Figure 2:
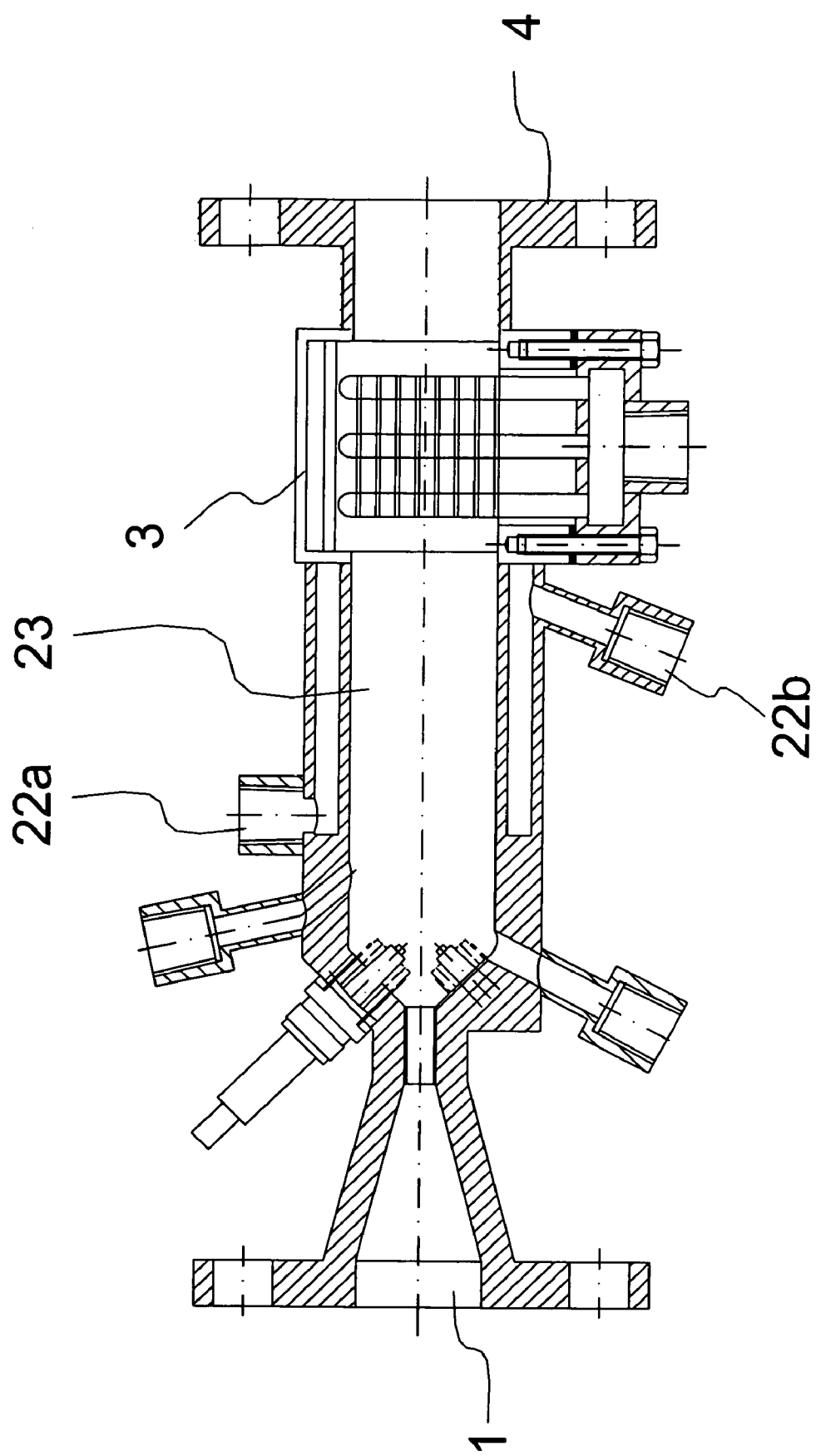
FIG. 2 is a sectional view of the preferred embodiment according to the present invention.

Please refer to FIG. 1 and FIG. 2, which are a perspective view and a sectional view of a preferred embodiment according to the present invention. As shown in the figures, the present invention is a high-voltage discharging reactor processing exhausted hydrogen, where electricity is discharged with high voltage to obtain high-temperature impulse plasma; and, when hydrogen gas passes by the impulse plasma area, the hydrogen gas to be burned is mixed with air immediately. The main chemical equation processed is:

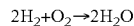

$$2H_2 + O_2 \rightarrow 2H_2O$$

Water is the final product obtained after the burning, which is no harm to environment. The oxygen required in the chemical equation is provided by the air guided in from the outside, for example compressed air. In the present invention, a stainless-steel pipe, which is 11 inches long and 1.5 inches for inner diameter and 1 and $11/16$ inches for outer diameter, is connected with a metal cone and a flange, which comprises 4.5 inches of outer diameter and four holes. A gas inlet 1 is located at the place where the flange is connected with the metal cone. The inner diameter of the metal cone is shrinked from 1.5 inches at the gas inlet 1 to $5/16$ inches to reduce rushing back of gas by the hydrogen explosion. A hydrogen combustion chamber 2 of 12 centimeters is connected at the backend of the metal cone. Air is guided in from air inlets 21a 21b at two sides of the hydrogen combustion chamber 2. An input port of a hydrogen-igniting device 23 is located at the front end of the hydrogen combustion chamber 2. A hydrogen gas mixed with air is ignited by the hydrogen igniting device 23, where the hydrogen igniting device 23 comprises two spark plugs, such as NGK BKR5E from Japan which are commonly used in vehicles, and a high-voltage ignition power supply, such as a general alternating high-voltage transformer. When the mixed gas is burned in the hydrogen combustion chamber 2, the water flown through the water inlet 22a and the water outlet 22b on the upper and lower surfaces is used to reduce and cool down the surface temperature of the hydrogen combustion chamber 2. A cooling device 3 is located at the backend of the hydrogen combustion chamber 2, which comprises cooling water ports 31 and a flame-extinguishing device 32. The cooling water ports 31 comprises a water inlet and a water outlet on the side surfaces of the flame-extinguishing device 3. The fire-extinguishing device 32 comprises three overlapping sets of stainless steel pipes with heat sink fins, which are also water cooled, to achieve the requirement of no burning frame at the gas outlet 4 connected at the end of the cooling device 3. The specifications for the gas outlet 4 are the same as those for the gas inlet 1. To obtain the experimental data of FIG. 3, a heat exchanging pipe and a noise elimination device can be connected at the end of the gas outlet 4, to further cool down the temperature of the exhausted gas and lowering down the noise of the air stream. The temperature of the exhausted gas was cooled down to 60° C.; and the noise elimination device lowers down the ultra-high decibel noise caused by the high-speed airflow which is formed by an instant expansion of high-temperature air after the burning. The DRE of hydrogen is obtained and determined by a simple hydrogen detector tube from a sampling hole at a side of the cooling device 3, whose detecting ability comprises a range between 0.05% and 4%.

Please refer to FIG. 3, which is a view showing a relation between the DRE of hydrogen and the airflow rate according to the present invention. The present invention processes the exhausted gas under a 1:2 of mixture rate of hydrogen flow and nitrogen flow. The result is examined by a simple hydrogen detector tube from a sampling port with 100 L/min of hydrogen flow, 200 L/min of nitrogen flow and 300-500 L/min of airflow. Under a steady functioning of the present invention, airflow is reduced gradually from 500 L/min to 300 L/min. When the airflow is 310 L/min, the result examined starts to change. At first, the DRE reaches 99.58%. As the airflow is reduced to 300L/min, its DRE still reaches 97.95%. Regarding the air flown over 325 L/min as oxygen-rich condition is provided, the remained-hydrogen concentration detected is below 0.05%, which is the lower limit for the detecting capability of the hydrogen detector tube. As a result, the DRE is beyond detection limit and is shown as ">99.99%" (greater than 99.99%). Thus, the present invention is a high-voltage discharging reactor for processing exhausted hydrogen gas and capable to reach a hydrogen gas DRE higher than 95%.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed are:

1. A high-voltage discharging reactor designed for processing exhausted hydrogen gas, comprising:
    an exhausted gas inlet;
    a hydrogen combustion chamber connected to an end of said gas inlet at an end of said hydrogen combustion chamber;
    a cooling device connected to another end of said hydrogen combustion chamber at an end of said cooling device;
    a processed gas outlet connected to another end of said cooling device; and
    a hydrogen-igniting device comprising two spark plugs and an alternating high-voltage power supply with impedance matching components, the hydrogen-igniting device being located at an end part of said hydrogen combustion chamber next to said exhausted gas inlet,
    wherein said gas inlet is located at a flange connected with a wider end of a metal cone and a narrower end of said metal cone is connected to a pipe leading to said hydrogen combustion chamber,
    wherein said cooling device comprises:
        a cooling water port comprising a water inlet and a water outlet located at two side surfaces of said cooling device; and
        a flame-extinguishing device connected with said another end of said hydrogen combustion chamber,
        wherein said flame-extinguishing device comprises sets of overlapping pipes extending into said hydrogen combustion chamber, said overlapping pipes having water-cooled heat sink fins thereon.

2. The reactor according to claim 1 wherein said hydrogen combustion chamber comprises: two air inlets located at two side surfaces of said hydrogen combustion chamber; and a water inlet and a water outlet located at two side surfaces of said hydrogen combustion chamber.

3. The reactor according to claim 1, wherein said reactor comprises a destruction and removal efficiency (DRE) of hydrogen gas higher than 95%.

4. The reactor according to claim 1, wherein an exhausted gas is processed by said reactor and comprises hydrogen and nitrogen mixed with air guided in.

5. The reactor according to claim 1, wherein the overlapping pipes with water-cooled heat sink fins extend the width of the hydrogen combustion chamber.

6. The reactor according to claim 5, wherein the overlapping pipes are stainless steel.

7. The reactor according to claim 6, wherein the sets of overlapping pipes are at least three sets of overlapping pipes.

* * * * *